Sept. 14, 1954  L. H. ZEUN  2,688,941
MACHINE FOR MOLDING PLASTIC ARTICLES
Filed April 6, 1951  2 Sheets-Sheet 1

INVENTOR.
LOUIS H. ZEUN
BY
Luther W Hawley
ATTORNEY

Sept. 14, 1954 L. H. ZEUN 2,688,941
MACHINE FOR MOLDING PLASTIC ARTICLES
Filed April 6, 1951 2 Sheets-Sheet 2
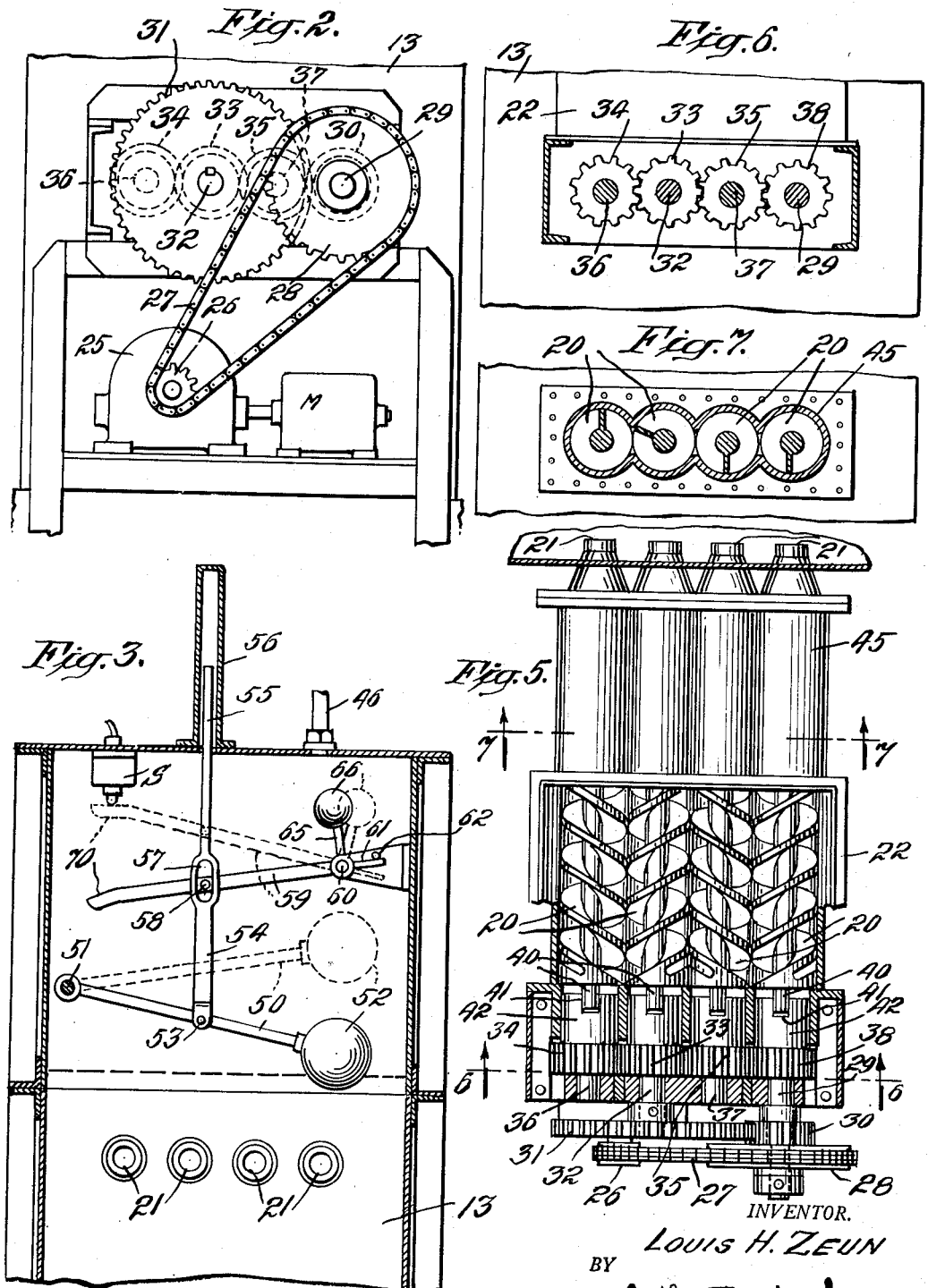
INVENTOR.
LOUIS H. ZEUN
BY Luther W Hawley
ATTORNEY Patented Sept. 14, 1954

2,688,941

UNITED STATES PATENT OFFICE 2,688,941

MACHINE FOR MOLDING PLASTIC ARTICLES

Louis H. Zeun, Naugatuck, Conn., assignor to Peter Paul, Inc., Naugatuck, Conn., a corporation of Delaware Application April 6, 1951, Serial No. 219,644

3 Claims. (Cl. 107—8)

This invention relates to a machine for molding plastic articles, such as candy molding machines.

The particular machine in connection with which the improvement has been developed and worked out, is the candy molding machine illustrated in Patent No. 2,000,027. In this machine the candy filling is pressed from a hopper into dies or mold cavities in the periphery of a drum or carrier.

In order to get a uniform product, the filling or plastic substance must be fed under uniform pressure. Too great pressure on the candy squeezes out the oils and syrup which are essential for the proper candy filling.

This invention has for its salient object to provide feeding mechanism for feeding plastic material or candy into matrices at uniform pressure.

Another object of the invention is to provide a regulating mechanism in a machine of the character described so constructed and arranged that uniform pressure is exerted on the plastic material or candy at a predetermined level.

Another object of the invention is to provide a machine of the character described, so constructed and arranged that the production per machine will be materially increased and the product will be uniform.

Further objects of the invention will appear from the following specification taken in connection with the drawings which form a part of this application, and in which Fig. 1 is a vertical sectional elevation of a machine constructed in accordance with the invention;

Fig. 2 is an end elevation of the left hand end of the machine shown in Fig. 1;

Fig. 3 is vertical sectional elevation taken substantially on line 3—3 of Fig. 1, looking in the direction of the arrows;

Fig. 5 is a horizontal sectional elevation through the screw feed mechanism for feeding the plastic material into the pressure chamber;

Fig. 6 is a sectional elevation taken substantially on line 6—6 of Fig. 5, looking in the direction of the arrows; and Fig. 7 is a sectional elevation taken substantially on line 7—7 of Fig. 5, looking in the direction of the arrows.

Figure 1:
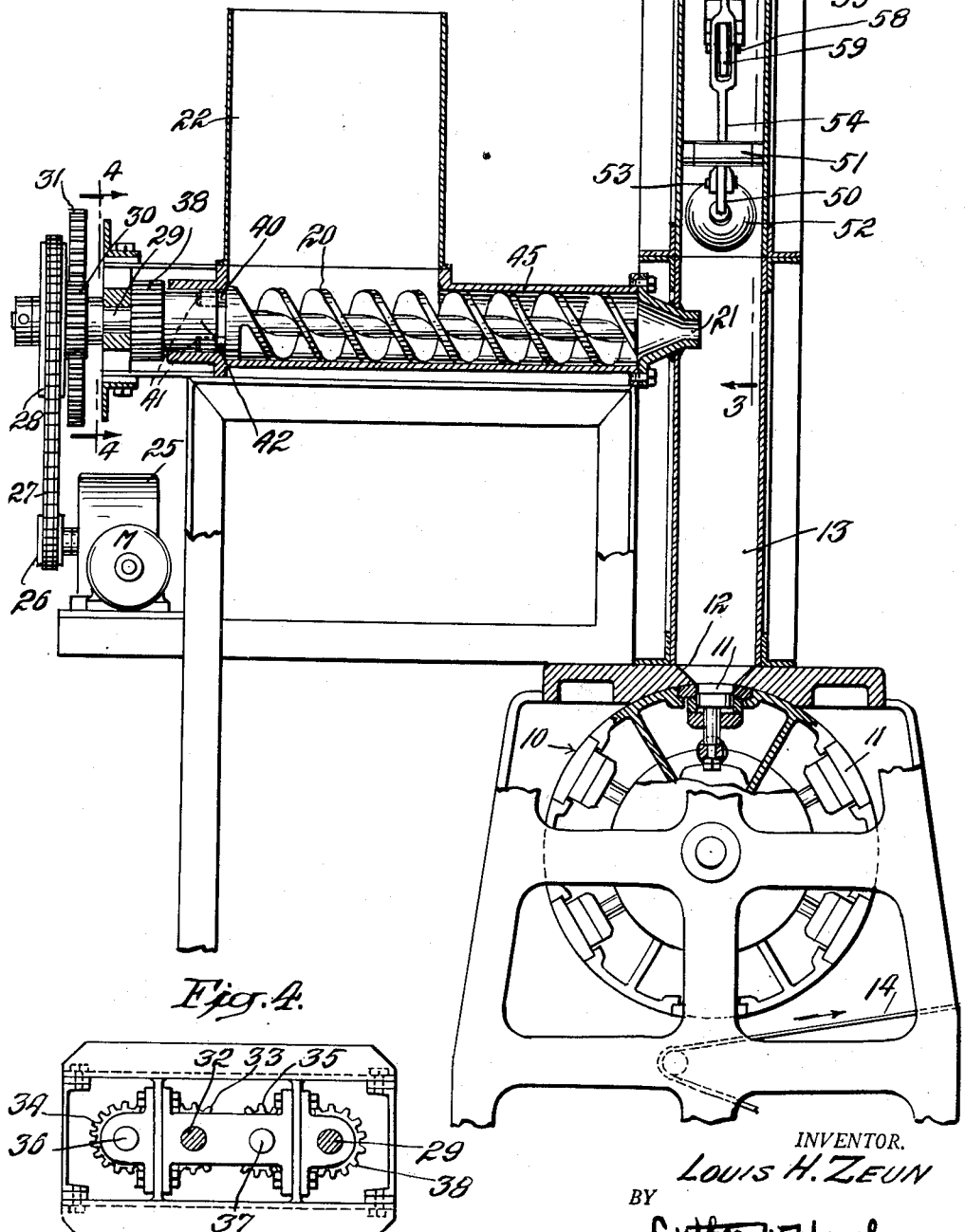
Figure 4:
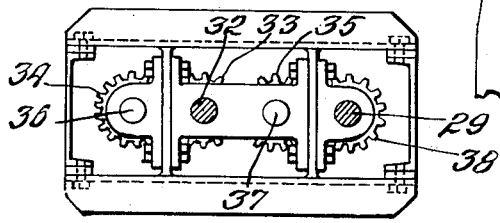
Fig. 4 is a sectional elevation taken substantially on line 4—4 of Fig. 1, looking in the direction of the arrows.

In the particular embodiment of the invention illustrated in the drawings, there is shown a rotatably mounted drum or carrier 10 having a plurality of sets of matrices or mold cavities 11 formed in the periphery thereof and adapted to receive the plastic material or candy filling. The drum or carrier 10 is preferably rotated continuously by any suitable driving connections and the mold cavities pass beneath and in registration with a discharge opening or port 12 disposed below a pressure chamber 13.

After the plastic material or candy filling has been forced into the peripheral matrices of the carrier 10, the carrier is rotated and the material in the mold cavities or matrices is discharged onto a belt 14. The details of the operation of the carrier and of the mechanism for discharging the contents of the mold cavities or matrices from the matrices onto the belt are not illustrated since they form no part of the present invention and are disclosed in the patent above mentioned.

The material which is discharged from the pressure chamber 13 into the matrices is fed into the pressure chamber by a plurality of screw conveyors 20, which force this material through discharge outlets 21 into the chamber 13. The screw conveyors receive the material from a hopper 22 and are operated in the following manner, attention being directed particularly to Figs. 1, 2 and 5.

The conveyors are operated from a motor M through a gear box 25 which has a sprocket 26 on which is mounted a chain 27 which drives a sprocket 28 loosely mounted on a shaft 29. The sprocket 28 has connected thereto a gear 30 which meshes with a gear 31 which is fixed to a shaft 32. Shaft 32 has also mounted thereon a gear 33 which meshes with gears 34 and 35 mounted on shafts 36 and 37. Gear 35 also meshes with a gear 38 mounted on the shaft 29. Each of the worms 20 has mounted thereon longitudinally extending lugs or clutch members 40 which engage recesses 41 formed in clutch members 42 which are rotated by the shafts 36, 32, 37 and 29.

Each of the screw conveyors 20 discharges the material through a cylindrical tube 45 which communicates with the hopper 22 and with the discharge nozzle 21. Thus, as the conveyors are rotated, the material is fed from the hopper into the pressure chamber 13.

Air pressure is exerted on the surface of the material in the chamber 13, compressed air being forced into the chamber from a suitable source through a pipe 46.

For the proper operation of the mechanism and in order to maintain a uniform pressure on the surface of the material, means is provided for maintaining the material in the chamber 13 at an approximately even or predetermined level. This is accomplished by means of the float valve illustrated in Fig. 3. In this figure a lever 50 is mounted on a fixed pivot 51 and has a ball 52 at one end adapted to contact the surface of the material in the chamber 13. The lever 50 is pivoted intermediate its ends at 53 to a vertical link 54 having an upwardly extending end 55 movable into and guided by a tube 56 mounted on the top of the chamber 13. The link 54 has a slot 57 intermediate its ends which receives a pin 58 carried by a lever 59 which is mounted on a pivot 60. The lever 59 has an extension 61 beyond the pivot 60 and the movement of the extension is limited by a stop pin 62. The pivot pin 60 for the lever 59 has extending upwardly therefrom, an arm 65, on the upper end of which is mounted a ball or weight 66.

When the lever 50 is raised by the material in the chamber 13 from the full line to the dotted line position in Fig. 3, the link 54 will raise the pin 58 of the lever 59 and as the lever 59 is raised the arm 65 and weight 66 will be swung over dead center position, thus raising the end 70 of the lever 59 into engagement with a switch S which is connected to and controls the operation of the motor M. In this manner the drive for the screw conveyors 20 will be disconnected and the material will not be fed thereby into the chamber 13 until the level of the material in the chamber is lowered, whereupon the float 52 will drop, thus lowering the link 51 and causing the lever 59 to move back to the full line position shown in Fig. 3. In the manner just described the material in the pressure chamber 13 will be maintained substantially at a predetermined level and the air pressure in the chamber will force the material into the matrices or mold cavities at a uniform pressure, thus producing a uniform product of the proper density and content.

Although one specific embodiment of the invention has been particularly shown and described, it will be understood that the invention is capable of modification and that changes in the construction and in the arrangement of the various cooperating parts may be made without departing from the spirit or scope of the invention, as expressed in the following claims.

What I claim is:

1. In a continuously operating machine for feeding highly viscous plastic material into mold cavities, a chamber having a discharge opening disposed above the mold cavities, said chamber adapted to contain a mass of viscous plastic material, power operated means for feeding material into said chamber below the normal operating level of the material in said chamber and maintaining a substantially constant level of material in said chamber, means controlled by the level of the material in the chamber for starting and stopping the operation of said power operated feeding means, and means for exerting a constant, uniform pressure on the material in the chamber.

2. In a continuously operating machine for feeding highly viscous plastic material into mold cavities, a chamber having a discharge opening disposed above the mold cavities, said chamber adapted to contain a mass of viscous plastic material, power operated means for feeding material into said chamber below the normal operating level of the material in said chamber and maintaining a substantially constant level of material in said chamber, means including a control member disposed above the feeding inlet into said chamber and controlled by the level of the material in the chamber for starting and stopping the operation of said power operated feeding means, and means for exerting a constant, uniform pressure on the material in the chamber.

3. In a continuously operating machine for feeding highly viscous material into mold cavities, a pressure chamber having a discharge opening disposed above the mold cavities, said chamber adapted to contain a mass of viscous plastic material, a hopper, conduits from the hopper to the chamber, the discharge ends of said conduits in the chamber being disposed below the normal level of the material in the chamber, power operated means for forcing the material through the conduits into the chamber, means controlled by the level of the material in the chamber for starting and stopping the operation of said power operated feeding means, and means for exerting a constant, uniform pressure on the material in the chamber.

References Cited in the file of this patent

UNITED STATES PATENTS

| Number | Name | Date |
| --- | --- | --- |
| 1,340,805 | Thomson | May 18, 1920 |
| 1,559,729 | Morris | Nov. 3, 1925 |
| 1,758,942 | Gottlieb et al. | May 20, 1930 |
| 1,937,904 | Mosher | Dec. 5, 1933 |
| 2,000,027 | Kazanjian | May 7, 1935 |
| 2,276,382 | Francis | Mar. 17, 1942 |
| 2,542,239 | Engels et al. | Feb. 20, 1951 |

FOREIGN PATENTS

| Number | Country | Date |
| --- | --- | --- |
| 33,421 | France | Apr. 23, 1928 |